United States Patent
Hirs

(10) Patent No.: US 6,200,490 B1
(45) Date of Patent: *Mar. 13, 2001

(54) METHOD OF OIL SEPARATION

(76) Inventor: Gene Hirs, 3822 Thirteen Mile Rd. Apt. D, Royal Oaks, MI (US) 48073

( * ) Notice: Subject to any disclaimer, the term of this patent is extended or adjusted under 35 U.S.C. 154(b) by 0 days.

This patent is subject to a terminal disclaimer.

(21) Appl. No.: 09/379,440

(22) Filed: Aug. 20, 1999

Related U.S. Application Data

(63) Continuation-in-part of application No. 09/076,953, filed on May 13, 1998, now Pat. No. 5,989,415, which is a continuation-in-part of application No. 08/784,084, filed on Jan. 15, 1997, now Pat. No. 5,795,478.

(51) Int. Cl.[7] .......................................................... C02F 1/40
(52) U.S. Cl. ........................... 210/799; 210/801; 210/521; 210/540; 210/DIG. 5
(58) Field of Search ..................................... 210/138, 519, 210/521, 522, 538, 540, DIG. 5, 799, 800, 801, 776, 802

(56) References Cited

U.S. PATENT DOCUMENTS

| | | |
|---|---|---|
| 1,405,126 | 1/1922 | Harris . |
| 2,578,040 | 12/1951 | Booth et al. . |
| 3,645,398 | 2/1972 | Fiocco ..................................... 210/73 |
| 3,853,753 | 12/1974 | Jones ....................................... 210/23 |
| 3,951,814 | 4/1976 | Krueger ................................ 210/488 |
| 4,039,441 | 8/1977 | Fett ..................................... 210/23 R |
| 4,123,365 | 10/1978 | Middelbeek ........................... 210/540 |
| 4,411,791 | 10/1983 | Ward ..................................... 210/649 |
| 4,422,931 | 12/1983 | Wolde - Micheal ................. 210/540 |
| 4,591,441 | 5/1986 | Sakai ..................................... 210/649 |
| 4,650,581 | 3/1987 | Angles et al. ........................ 210/398 |
| 4,980,070 | 12/1990 | Lieberman ...................... 210/DIG. 5 |
| 5,006,260 | 4/1991 | Roques et al. ........................ 210/708 |
| 5,017,294 | 5/1991 | Durrieu ................................. 210/708 |
| 5,022,992 | 6/1991 | Looker ................................. 210/521 |
| 5,151,185 | 9/1992 | Himmerschmitt .................... 210/521 |
| 5,156,745 | 10/1992 | Cairo et al. ........................... 210/703 |
| 5,236,585 | * 8/1993 | Fink ..................................... 210/538 |
| 5,411,665 | 5/1995 | Scraggs ................................ 210/610 |
| 5,505,861 | 4/1996 | Hirs ..................................... 210/521 |
| 5,549,823 | 8/1996 | Hirs ..................................... 210/265 |
| 5,554,301 | * 9/1996 | Rippetoe et al. ..................... 210/802 |
| 5,681,462 | 10/1997 | Brockhoff et al. .............. 210/DIG. 5 |
| 5,730,872 | 3/1998 | Rhodes ................................. 210/519 |

FOREIGN PATENT DOCUMENTS 53 91 462    8/1978   (JP) .

* cited by examiner

*Primary Examiner*—Christopher Upton
(74) *Attorney, Agent, or Firm*—Lyon PC

(57) ABSTRACT

A system and method for separating free oil from industrial coolant comprises directing said fee oil and coolant through a coalescing cartridge having a plurality of polymeric elements therein into a tank having a plurality of settling chambers. Free oil is removed from the coolant through oleophilic attraction between the free oil and the surface of the polymeric elements. Free oil remaining in the coolant is further separated from therefrom through Gravitational separation. A plurality of weirs and baffles interposed between the settling chambers provide continuous return of purified coolant to the system and periodic decanting of separated free oil.

6 Claims, 4 Drawing Sheets

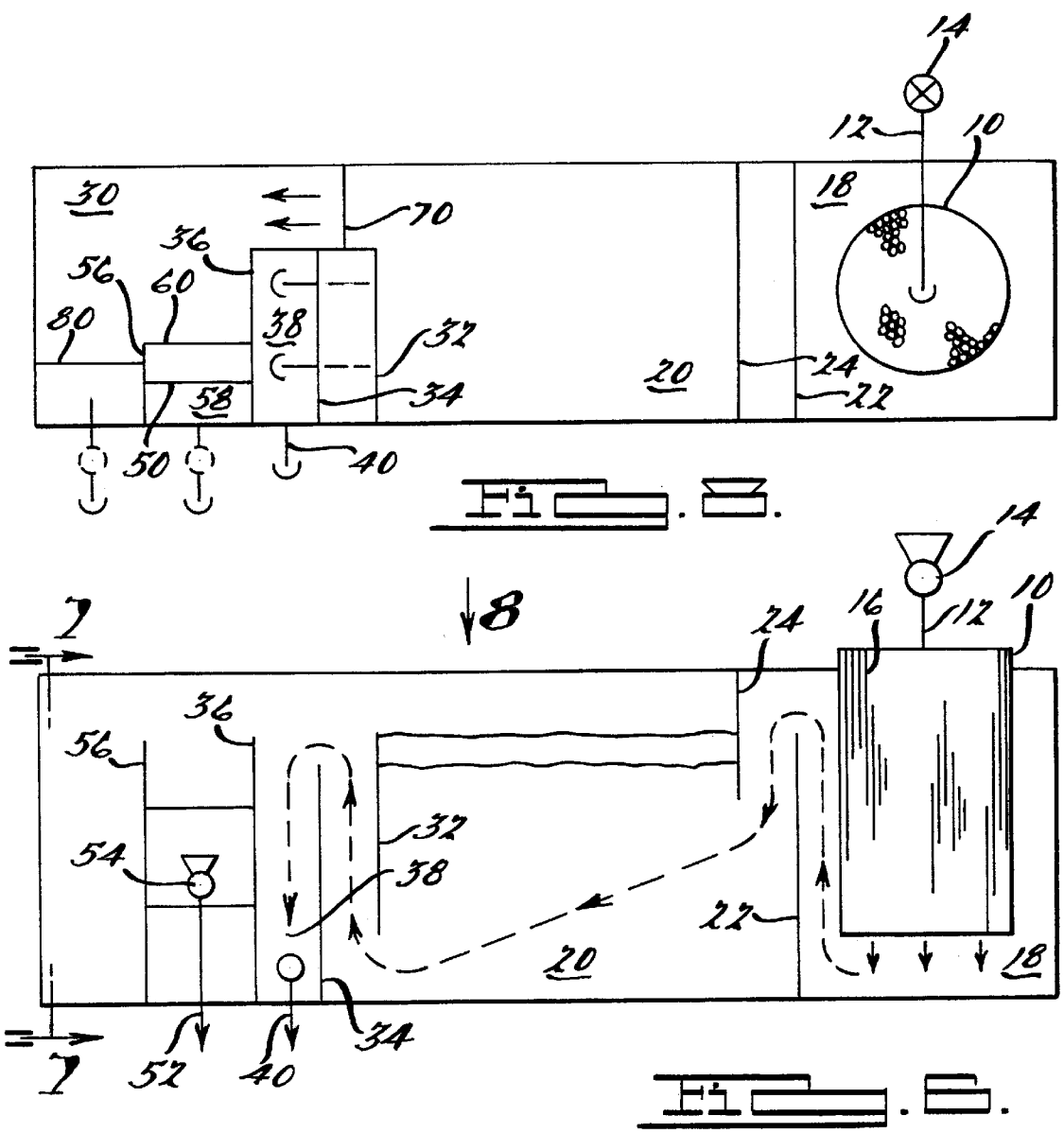
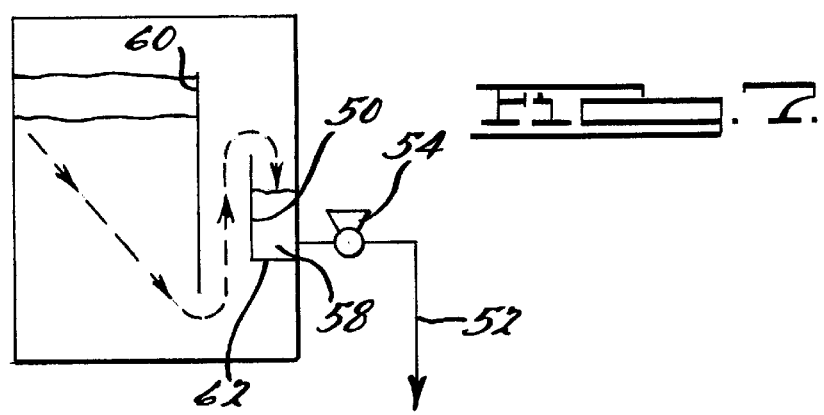

METHOD OF OIL SEPARATION

CROSS REFERENCE TO RELATED APPLICATIONS

The present application is a continuation-in-part of U.S. application Ser. No. 09/076,953 filed on May 13, 1998, now U.S. Pat. No. 5,989,415, which is a continuation-in-part of U.S. application Ser. No. 08/784,084, now U.S. Pat. No. 5,795,478, filed on Jan. 15, 1997.

BACKGROUND OF THE INVENTION

The present invention relates generally to liquid purification systems and more particularly to a system and method for removing free oil from coolant utilized in industrial machining applications.

Industrial machining operations generally require the use of coolants to prevent damage to tools and minimize wear caused by excessive heat. Typically, a coolant comprises an oil-in-water emulsion wherein water is the continuous phase, oil is the disperse phase, and soap is the emulsifying agent.

The oil-in-water emulsion is stabilized by electromechanical forces which are weakened or destroyed by contaminants in the form of metallic ions, free oil and bacterial action. The primary culprit in coolant deterioration is free or "tramp" oil which must be removed to maintain the stability and equilibrium of the emulsion.

SUMMARY OF THE INVENTION

The aforesaid problem is solved, in accordance with a preferred constructed embodiment of the pre sent invention, by an improved free oil separation system and method that removes free oil from an oil-in-water emulsion. The oil separation system is disposed downstream of the machining process to accept contaminated coolant produced during the machining operation.

The oil separation system and method of the present invention comprises a plurality of spaced polymeric elements, for example polypropylene tubes, that are positioned above a primary settling chamber. Contaminated coolant flows through the elements without restriction. Oleophilic surface attraction between the polymeric elements and free oil in the coolant attracts and binds the free oil to the walls of the vertically oriented elements where further coalescing of the free oil occurs. The coolant and coalesced oil globules then flow out of the polymeric elements and into a primary settling chamber where gravitational separation of the free oil from the coolant occurs.

Coalesced free oil globules rise upwardly, passing over a primary oil weir and into a secondary settling chamber. Partially cleansed processing fluid is directed beneath a primary coolant baffle thence over a primary coolant weir where free oil again rises and flows into the secondary settling chamber. A primary decant chamber, separated from the secondary settling chamber by a decant chamber wall, is provided with an outlet conduit to allow purified coolant to flow back to the system. Once in the secondary settling chamber, partially cleansed coolant flows over a secondary fluid weir where a second outlet conduit which is opened and closed by a normally open outlet valve is provided to return the remaining purified coolant to the system.

Free oil decanting is accomplished by closing the normally open outlet valve until the coolant and free oil level in the secondary settling chamber rises to the level required to allow free oil on the surface thereof to flow over a waste oil weir into a waste oil chamber. The waste oil chamber is provided with a waste oil conduit that allows for decanting of free oil. The waste oil chamber is further provided with a bottom that prevents separated free oil that flows over the waste oil weir from draining back into the secondary settling chamber.

The aforesaid operation is controlled by a timer that provides for a predetermined waste oil removal period during which the normally open outlet valve is energized closed thereby raising the free oil and coolant level in the secondary settling chamber to allow free oil to flow over the waste oil weir for decanting. By adjusting a fluid inlet valve that controls coolant and free oil flow into the inlet plenum, flow through the separator may be limited such that the total flow through the secondary settling chamber is five to ten percent of the total flow through the entire system.

This flow limitation allows for maximum efficiency in free oil separation and decanting. Furthermore, the use of flow limited multistage gravitational separation eliminates the necessity of employing a surface skimmer to remove free oil from the surface of the oil-in-water emulsion. Known in the art surface skimmers often suffer from the disadvantage that they remove large quantities of coolant mixture from the system, in addition to surface resident free oil, thereby providing for inefficient separation of free oil from coolant.

Therefore, one object of the instant invention is to provide an oil separation system and method that collects and decants a greater concentration of waste oil than known oil separators.

A further object of the present invention is to provide an oil separation system and method that decants waste oil without employing inefficient surface skimmers.

Further objects, features and advantages of the instant invention will be readily apparent from the following detailed description thereof with reference to the accompanying drawing Figures and claims appended hereto.

BRIEF DESCRIPTION OF THE DRAWINGS

FIG. 6 is a sectional elevational view of an alternative embodiment of the invention showing a coalescing cartridge disposed within an inlet plenum.

FIG. 7 is a view of an alternative embodiment of the present invention taken along the line 7—7 of FIG. 6.

FIG. 8 is a view of an alternative embodiment of the present invention taken in the direction of the arrow 8 of FIG. 6.

DETAILED DESCRIPTION OF THE PREFERRED EMBODIMENT

Figure 1:
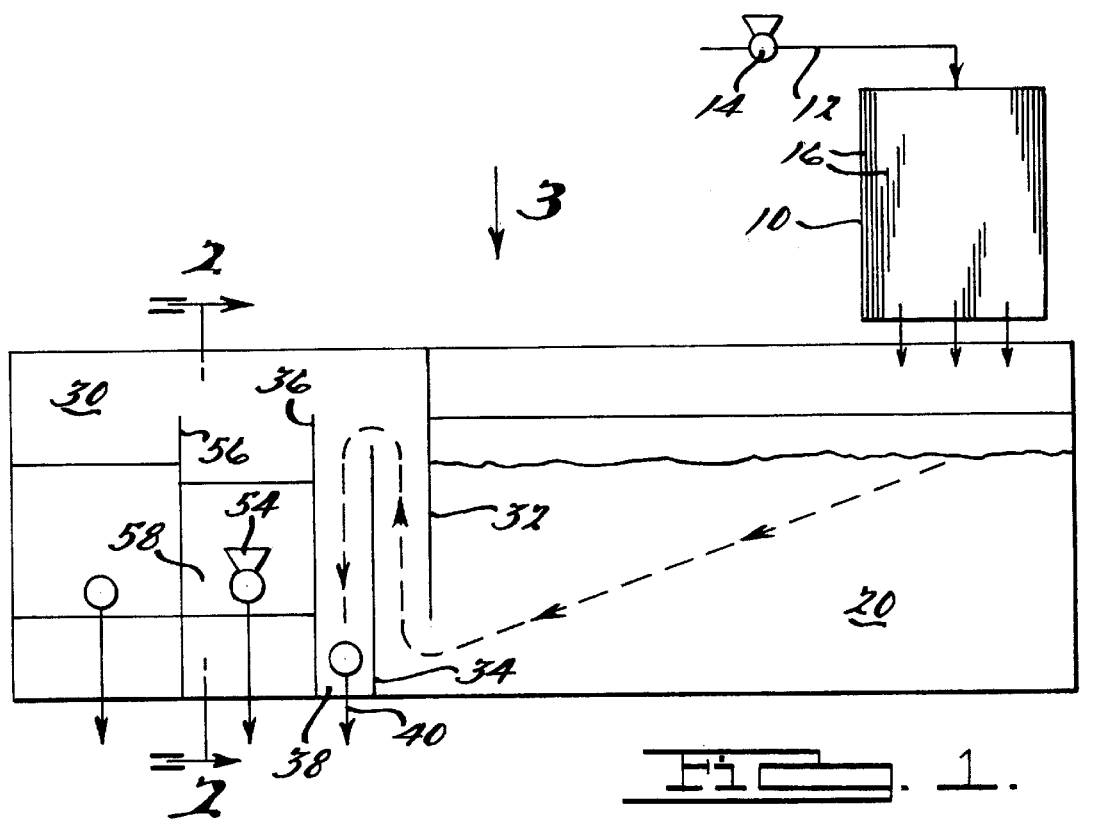
FIG. 1 is a sectional elevational view of a preferred constructed embodiment of the present invention.
Figure 2:
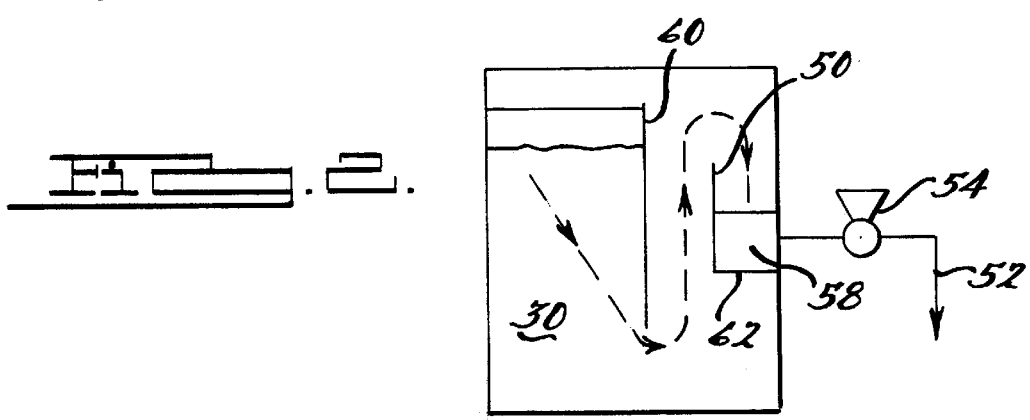
FIG. 2 is a view of the present invention taken along the line 2—2 of FIG. 1.
Figure 3:
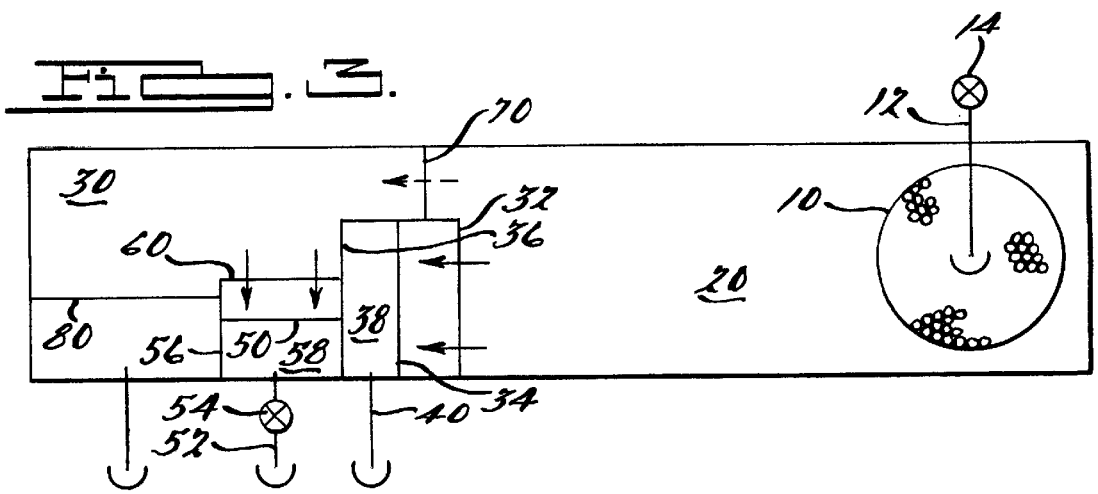
FIG. 3 is a view of the instant invention taken in the direction of the arrow 3 of FIG. 1.

As shown in FIGS. 1, 2, and 3, a system and method for separating free oil from industrial coolant comprises an oil coalescing cartridge 10 for acceptance of free oil and coolant through an inlet conduit 12. The inlet conduit 12 is provided with an inlet valve 14 which may be utilized to adjust the total oil and coolant flow into the separator. The oil coalescing cartridge 10 is comprised of spaced polymeric elements 16 positioned proximate a primary settling chamber 20 such that the entering oil and coolant mixture pass through the cartridge 10 and into the settling chamber 20. In a preferred constructed embodiment of the present invention the oil coalescing cartridge 10 is comprised of a plurality of polymeric elements 16, for example high-density polyethylene tubes 4 to 5 feet in length, arranged vertically above the primary settling chamber 20.

Figure 9:
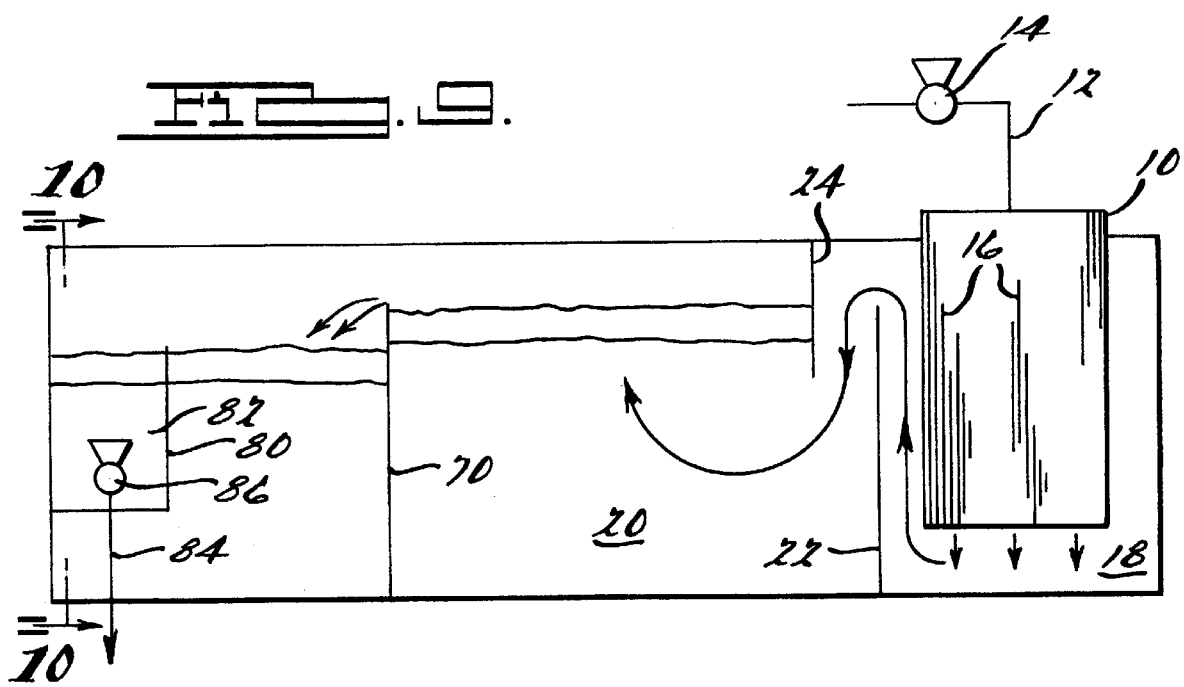
FIG. 9 is a sectional elevational view of an alternative embodiment of the present invention showing only the flow of separated oil through the system.

In an alternative embodiment of the instant invention shown in FIGS. 6, 8 and 9, the primary settling chamber 20 is further provided with an intake plenum 18 that is separated from the primary settling chamber 20 by an inlet weir 22 extending upwardly from the bottom of the intake plenum 10 and an inlet baffle 24 extending downwardly from the top of the settling chamber 20. The coalescing cartridge 10 is then positioned within the intake plenum 18 such that the entering oil and coolant pass downwardly through the cartridge 10 and into the inlet plenum 18. The inlet weir 22 then directs the oil and coolant upwardly from the bottom of the intake plenum 10 towards the inlet baffle 24. The inlet baffle 24 then directs the fluid flow downwardly into the primary settling chamber 20.

As seen in FIGS. 1 and 3, a secondary settling chamber 30 is separated from the primary settling chamber 20 by a primary coolant baffle 32 extending downwardly from the top of the primary settling chamber 20, a primary coolant weir 34 extending upwardly from the bottom of the secondary settling chamber 30 and a decant chamber wall 36, also extending upwardly from the bottom of the secondary settling chamber 30. Primary coolant weir 34 and decant chamber wall 36 depend from a first wall of the secondary settling chamber 30 to define a primary decant chamber 38. The primary coolant baffle 32 directs coolant upwardly from the primary settling chamber 20, over the top of primary coolant weir 34 and into primary decant chamber 38. The primary decant chamber 38 is provided with a conduit 40 for withdrawing purified coolant continuously therefrom.

In accordance with the preferred constructed embodiment of the instant invention and as shown in FIGS. 1 and 3, a secondary coolant weir 50 abuts the decant chamber wall 36 on a first side and a secondary coolant chamber wall 56 on a second side. The secondary coolant chamber wall 56 depends from the first wall of the secondary settling chamber 30 and abuts the secondary coolant weir 50 on one side. A secondary decant chamber 58 is bounded by secondary coolant chamber wall 56, secondary coolant weir 50, decant chamber wall 36, and the first wall of the secondary settling chamber 30. Furthermore, the secondary decant chamber 58 is provided with an outlet conduit 52 that is opened and closed by a normally open solenoid valve 54 for releasing purified coolant back to the system. The normally open valve 54 is solenoid actuated in an alternative embodiment of the instant invention.

As best seen in FIGS. 2 and 3, secondary coolant baffle 60 is positioned between decant chamber wall 36 and secondary coolant chamber wall 56, parallel to secondary coolant weir 50. The secondary coolant baffle 60 is spaced from the bottom of the secondary settling chamber 30 such that purified coolant flows from secondary settling chamber 30 under the secondary coolant baffle 60 thence over secondary coolant weir 50 into secondary decant chamber 58 prior to returning to the system through conduit 52. The secondary decant chamber 58 is further provided with a bottom 62 that prevents purified coolant from flowing back into the secondary settling chamber 30.

Figure 4:
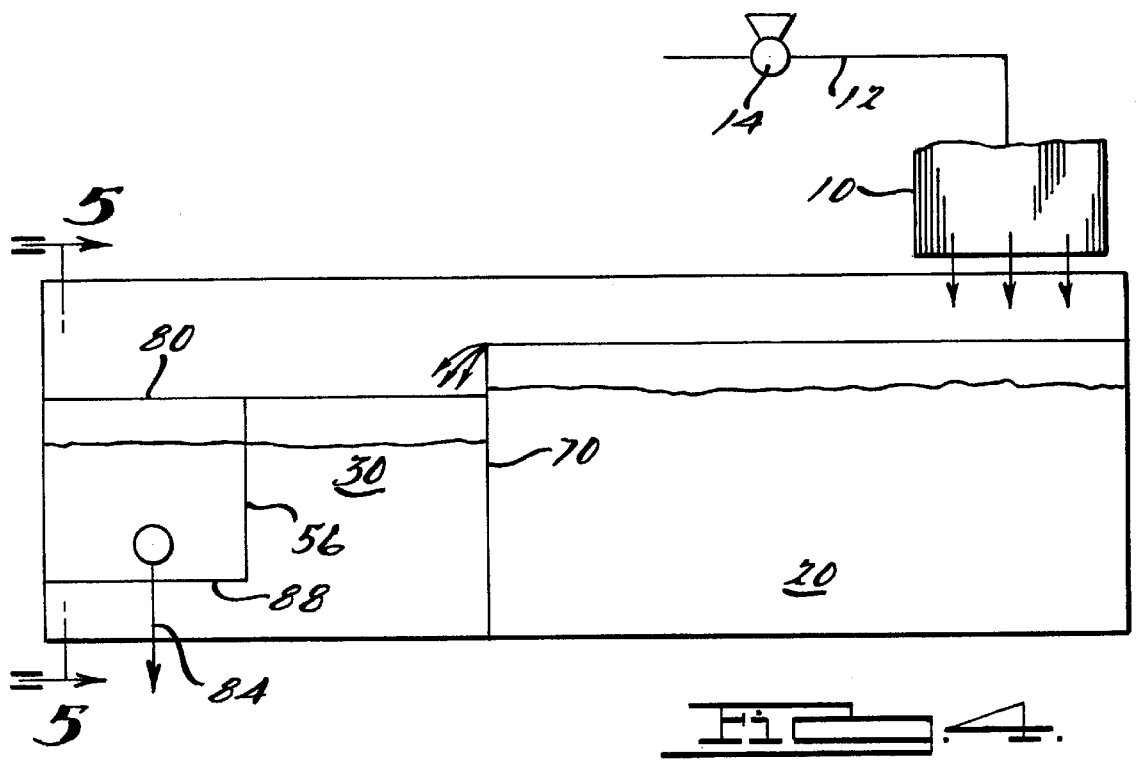
FIG. 4 is a sectional elevational view of the present invention showing only the flow of separated oil through the system.

In a preferred constructed embodiment of the instant invention and in accordance with FIGS. 3 and 4, a primary oil weir 70 is interposed between the primary settling chamber 20 and the secondary settling chamber 30 adjacent to the primary fluid baffle 32. The primary oil weir 70 separates the primary settling chamber 20 from the secondary settling chamber 30 such that coalesced free oil on the surface of the coolant in the primary settling chamber 20 passes over the primary oil weir 70 and into the secondary settling chamber 30.

Figure 5:
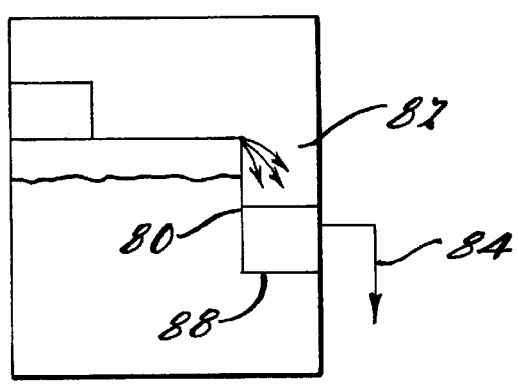
FIG. 5 is a view of the present invention taken along the line 5—5 of FIG. 4.

As shown in FIGS. 3, 4 and 5, a waste oil weir 80 is disposed within secondary settling chamber 30 adjacent to the secondary coolant weir 50 such that free oil floating on the surface of the coolant in secondary settling chamber 30 flows up and over waste oil weir 80 when the level in the secondary settling chamber 30 is sufficiently high. For reasons explained hereinbelow, the top of the waste oil weir 80 must be higher than the top of secondary coolant weir 50 such that coolant will flow over secondary fluid weir 50 prior to reaching the top of waste oil weir 80. The waste oil weir 80 depends from a waste oil bottom 88 that prevents free oil flowing over the waste oil weir 80 from flowing back into the secondary settling chamber 30. A waste oil chamber 82 is bounded by the waste oil weir 80, the secondary coolant chamber wall 56, the waste oil bottom 88, and first and second walls of the secondary settling chamber 30. The waste oil chamber 82 is further provided with a waste oil conduit 84 that allows free oil to be decanted at timed intervals as explained hereinbelow.

Figure 10:
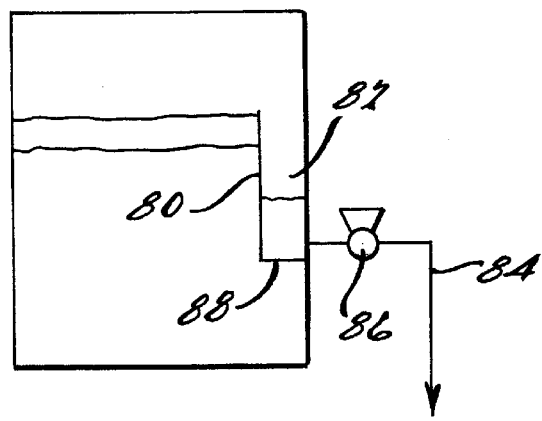
FIG. 10 is a view of an alternative embodiment of the present invention taken along the line 10—10 of FIG. 9.

In an alternative embodiment of the instant invention as shown in FIGS. 9 and 10, the waste oil conduit 84 is opened and closed by a normally closed solenoid actuated valve 86 for oil decanting at timed intervals.

Figure 11:
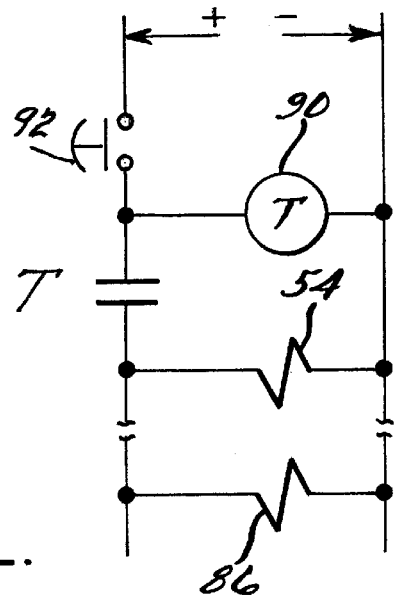
FIG. 11 is an electrical schematic of a control circuit for the solenoid valves utilized in the present invention.

As shown in FIG. 11 both the normally open valve 54 and the normally closed valve 86 utilized in the alternative embodiment of the present invention are actuated by a timer 90 that energizes the solenoid valves for predetermined time intervals. The timer duration may be selected to maximize separator efficiency while providing for regular decanting of free oil collected in the waste oil chamber 82 depending on the concentration of free oil in the coolant and the flow rate through the system. In one embodiment of the present invention the timer may be activated or deactivated by a conventional pushbutton 92, or alternatively, by any switching means, when free oil decanting is desired.

Operation of the oil separation system begins when oil-contaminated coolant supplied through the intake conduit 12 passes through the oil coalescing cartridge 10 into the primary settling chamber 20. Alternatively, and in accordance with the alternative embodiment of the present invention as shown in FIG. 6, the oil and coolant supplied through the intake conduit pass downwardly through the oil coalescing cartridge 10 and into the intake plenum 18. The oil and coolant are directed upwardly by the inlet weir 22 and then downwardly into the primary settling chamber 20 by the inlet baffle 24. The inlet baffle 24 minimizes flow turbulence caused by flow through the coalescing cartridge 10 and distributes oil and coolant flow evenly through the primary settling chamber 20.

In the primary settling chamber 20 the lighter coalesced oil rises to the top of the oil and coolant mixture and the denser coolant settles to the bottom thereof. The primary coolant baffle 32 then directs the partially cleansed coolant into the primary decant chamber 38 defined by primary coolant weir 34 and decant chamber wall 36 where it flows back to the coolant system through the conduit 40. Referring to the flow of separated, free oil through the system depicted in FIG. 9, the coalesced oil on the surface of the primary settling chamber 20 passes over the primary oil weir 70 and into the secondary settling chamber 30. In order to assure complete separation of the free oil from the coolant, inlet flow may be limited by adjustment of the inlet valve 14 such that the oil-contaminated coolant resides in the primary settling chamber 20 for ten to twenty minutes before flowing back into the system.

The remaining coolant in the secondary settling chamber 30 is allowed to settle to the bottom of the chamber 30 and is then directed downwardly by the secondary coolant baffle 60 over the secondary coolant weir 50, and into secondary coolant chamber 58. The outlet conduit 42 and the normally open valve 44 allow the purified coolant to flow back into the system. In one embodiment of the instant invention the amount of flow out of the secondary coolant chamber 58 is in the range of 5 to 10 percent of the total flow through the separation system. Therefore, the flow out of the primary decant chamber 38 is 90 to 95 percent of the total flow through the system.

Free oil collects on the surface of the coolant in the secondary settling chamber 30 until the timer 90 times out, thereby initiating free oil decanting. Timer 90 is initiated at preset time intervals to actuate the normally open valve 54. When the normally open valve 54 is actuated it closes, thereby terminating the flow of coolant out of the secondary coolant chamber 58 and causing the level of coolant, and oil on the surface thereof, in the secondary settling chamber 30 to rise. When this oil and coolant level in the secondary settling chamber 30 reaches the top of the waste oil weir 80, the free oil collected on the surface of the coolant passes over the waste oil weir 80 thence into the waste oil chamber 82 and out of the system through the waste oil conduit 84.

In accordance with the alternative embodiment of the instant invention as shown in FIGS. 9 and 10, upon initiation of the timer 90 at its preset time interval the normally closed valve 86 is energized to the open position and thus free oil is decanted from the chamber 82 through the waste oil conduit 84. The timer 90 duration is adjustable depending on the amount of free oil to be decanted. The normally closed valve 86 prevents inadvertent decanting from the waste oil chamber 82 until decanting is desired. Additionally, push-button 92 may remove electrical power from timer 90, thereby terminating the timed operation of the solenoid actuated valves for purposes of maintenance or manual decanting of free oil.

Although the preferred embodiments of the instant invention have been disclosed in detail, it will be appreciated by one of ordinary skill in the art that the various structural and operational features herein disclosed are susceptible to modification without departing from the scope of the following claims.

I claim:

1. A method of separating free oil from industrial coolant comprising the steps of:
    coalescing the free oil in the coolant in a polymeric element;
    separating the free oil from the coolant by gravity in a primary settling chamber;
    passing free oil on the surface of the coolant in said primary settling chamber over a primary oil weir into a secondary settling chamber;
    directing coolant in said primary settling chamber downwardly under a primary coolant baffle thence upwardly over a primary coolant weir into a primary decant chamber;
    withdrawing coolant continuously from said primary decant chamber;
    directing the coolant in said secondary settling chamber downwardly under a secondary coolant baffle thence upwardly over a secondary coolant weir into a secondary decant chamber;
    withdrawing coolant periodically from said secondary decant chamber;
    passing free oil on the surface of the coolant in said secondary settling chamber over a waste oil weir into a waste oil chamber; and
    decanting free oil from said waste oil chamber.

2. A method of separating free oil from industrial coolant as claimed in claim 1 wherein the volume of coolant withdrawn from said secondary decant chamber is five to ten percent of the total volume of free oil and coolant directed into said primary settling chamber.

3. A method of separating free oil from industrial coolant comprising the steps of:
    coalescing the free oil in the coolant in a vertically oriented polymeric element;
    separating the free oil from the coolant by gravity in a primary settling chamber;
    passing free oil on the surface of the coolant in said primary settling chamber over a primary oil weir into a secondary settling chamber;
    directing coolant in said primary settling chamber downwardly under a primary coolant baffle thence upwardly over a primary coolant weir into a primary decant chamber;
    withdrawing coolant continuously from said primary decant chamber; directing the coolant in said secondary settling chamber downwardly under a secondary coolant baffle thence upwardly over a secondary coolant weir into a secondary decant chamber;
    withdrawing coolant periodically from said secondary decant chamber;
    passing free oil on the surface of the coolant in said secondary settling chamber over a waste oil weir into a waste oil chamber; and
    decanting free oil from said waste oil chamber.

4. A method of separating free oil from industrial coolant as claimed in claim 3 wherein the volume of coolant withdrawn from said secondary decant chamber is five to ten percent of the total volume of free oil and coolant directed into said primary settling chamber.

5. A method of separating free oil from industrial coolant comprising the steps of:
    coalescing the free oil in the coolant in a polymeric element;
    directing the free oil and coolant into an inlet plenum;
    directing the free oil and coolant in said inlet plenum upwardly over an inlet weir thence downwardly under an inlet baffle into a primary settling chamber;
    separating the free oil from the coolant by gravity in said primary settling chamber;
    passing free oil on the surface of the coolant in said primary settling chamber over a primary oil weir into a secondary settling chamber;

directing coolant in said primary settling chamber downwardly under a primary coolant baffle thence upwardly over a primary coolant weir into a primary decant chamber;

withdrawing coolant continuously from said primary decant chamber;

directing the coolant in said secondary settling chamber downwardly under a secondary coolant baffle thence upwardly over a secondary coolant weir into a secondary decant chamber;

withdrawing coolant periodically from said secondary decant chamber;

passing free oil on the surface of the coolant in said secondary settling chamber over a waste oil weir into a waste oil chamber; and decanting free oil from said waste oil chamber.

6. A method of separating free oil from industrial coolant as claimed in claim 5 wherein the volume of coolant withdrawn from said secondary decant chamber is five to ten percent of the total volume of free oil and coolant directed into said primary settling chamber.

* * * * *